Patented Aug. 22, 1944

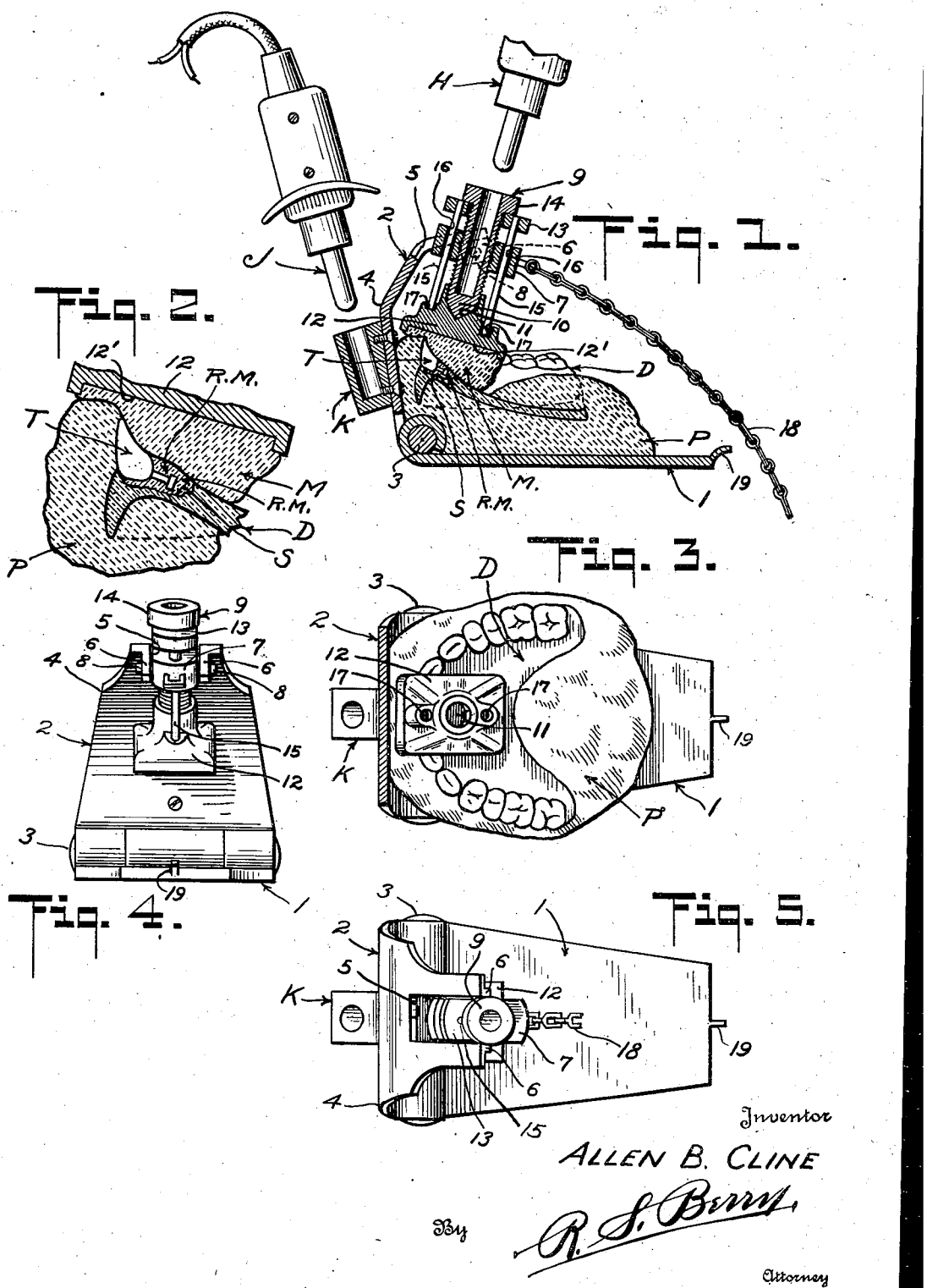

2,356,447

UNITED STATES PATENT OFFICE 2,356,447

DENTURE REPAIRING DEVICE

Allen Bernard Cline, Rosemead, Calif.

Application August 3, 1942, Serial No. 453,481

11 Claims. (Cl. 18—33)

This invention relates to the repairing of dentures and has for an object the provision of a simple and inexpensive device by means of which dentures may be much more quickly and effectively repaired than heretofore.

Another object of my invention is to provide a repair device of the character described which is especially designed to properly cure with heat and pressure the plastic material employed to repair the denture, while giving the repaired part of the denture the exact formation and contour present in the original denture, there being a novel matrix holder for a contour-restoring mold which makes possible direct "spot" pressure and transfer of heat to the repair material in small and predetermined areas, as in replacing a single tooth, without deranging adjacent teeth or causing distortion of the plate.

A further object of my invention is to provide a denture repairing device which is small, compact and subject to being readily set up on a bench and easily operated without danger of distorting the denture in any manner.

Another object of my invention is to provide a method of repairing dentures which is novel and advantageous by reason of making possible a great saving in time, providing for accuracy in repair and tooth replacement and the avoidance of any derangement or distortion of the denture or any part thereof.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a sectional view of a repair unit embodying my invention as when employed to replace a tooth in a denture, the electric heaters being withdrawn for the sake of clarity of illustration;

Fig. 2 is an enlarged fragmentary sectional view particularly showing how the mold and holder are applied in the repair operation;

Fig. 3 is a fragmentary top plan view of the device with parts broken away and in section for clarity of illustration;

Fig. 4 is a rear elevation of the device with the heaters removed;

Fig. 5 is a top plan view of the device as when not in use, the heaters and part of the latch chain being removed;

Referring to the drawing more specifically, it is seen that one embodiment of my invention includes a flat elongated metal base plate 1 to one end of which is hinged an upstanding plate-like member or arm 2, hinged as at 3. The member 2 is bent angularly inward as at 4 so as to overlie the plate 1 and at its upper end is bifurcated as at 5 and formed with depending flanges 6 in order to pivotally support a nut 7. The nut 7 is provided with pintles 8 pivoted in the flanges 6, said nut being elongated and arranged to swivel or pivot in the bifurcated part 5 of the member 2.

A tubular screw 9 is axially adjustable in the nut 7 and has a pointed closed lower end 10 which has a non-threaded and rotative bearing in a socket 11 formed in a matrix holder 12.

A ring 13 is mounted on the screw 9 against the underside of the screw head 14 and has pins 15 fixed thereto so as to depend therefrom. These pins extend freely through openings 16 in the nut and at their lower ends engage in sockets 17 in the matrix holder 12 to keep the holder from turning upon the manipulaion of the screw 9.

It is now seen that the screw 9 provides for moving the matrix holder so that a mold or matrix M therein may be pressed against the part of the denture D to be repaired, it being possible to maintain the mold in such contact under the desired pressure and to retract the mold upon appropriate manipulation of the screw.

The denture D to be repaired is set in plaster P in the desired position on the base plate 1 and thus held thereon, the plaster covering the plate D of the denture except the part to be repaired and securely holding the denture as shown in Fig. 1 so that the mold or matrix M may be properly positioned over and "pressure-contacted" with the repair material R. M. As here shown this repair material is set in a socket or cavity S which is formed in the plate D, the purpose being to reset a tooth T in the denture and the repair material being therefore molded to said socket around the tooth by hand in the estimated amount to bring about the proper repair.

The mold or matrix M is made in any suitable manner well known in the art to reproduce the contour of the original denture at the repair area and is made of plaster which is adhered to and within the flanged underside 12' of the holder. This mold will contact and fit the tooth and the upper surface of the repair material R. M. when the holder is properly positioned as shown in Fig. 1 and the screw 9 tightened.

In Fig. 1 the adjustment is such that the axis of the screw is on the center line of the hinge and the upper plate 2 will not be moved upon the tightening of the screw 9 to bring the matrix M against the denture. In other adjustments "off center," the latch chain 18 fixed to the nut 7 is employed to hold the plate 2 in the desired position, said chain being hooked over the hook 19 on the plate 1.

With the parts in the position shown in Fig. 1 and the desired pressure on the mold M, and denture D provided for by means of appropriate adjustment of the screw 9, the electric heater H is socketed in the tubular screw 9 to apply heat to the repair material R. M. through the screw, the matrix holder and the mold. If desired another electric heater J may be used to speed up the repair operation, said additional heater being mounted in a socket K fixed on the plate 2 adjacent the hinged end thereof. This will apply heat to the repair region of the denture through the plate 2 and plaster bed in which the denture is held.

It is seen that the pivoted nut 7, screw 9 and associated elements make possible the necessary adjustment of the matrix holder to "spot" the mold or matrix M as desired throughout a denture, to reset a single tooth or a plurality thereof with a direct application of heat and pressure to only that part requiring it and so that all danger of deranging the other teeth or washing or distorting the plate as is often the case where heat is applied too generally or throughout the denture is prevented.

The application of heat and pressure in accordance with this invention to the repair material R. M. will cause this material to fuse with the plate material and form a monolithic structure in which the denture takes its original appearance and contour about the repair region. The apparatus and method hereof are of course applicable only to dentures made of plastics (and many such are now in use) which are subject to being fused and cured by pressure and heat in accordance with the provisions hereof.

It should be noted that one repair method devolving hereon takes into consideration the formation in the plate of the denture in any suitable manner of a socket or cavity for reception of the tooth to be replaced and sufficient repair material to fill the cavity and retain the tooth in the plate. The tooth is then set in the cavity and a wax core is molded therein around the tooth with its outer surface contoured to conform to the contour of the original plate. The wax core and tooth are then removed and a mold or matrix of plaster is made therefrom, for example the mold M here shown. Next the plastic repair material is placed in the cavity and around the tooth in the estimated amount and thereafter the mold is pressed against the tooth and said material and heat applied through the mold while the latter is maintained under pressure against the denture, until the plastic repair material fuses with the material of the plate and assumes the contour of the mold, thereby completing the repair operation except for possibly grinding away any excess material around the margins of the repair area.

I claim:

1. In a denture repairing device, a base for supporting a denture to be repaired, a member swingably carried by said base, a nut supported on said member for positioning over said base, said nut being swingable in relation to said member, a tubular screw axially adjustable in said nut toward and away from said base, a matrix holder having a socket therein in which the lower end of the screw is mounted, a mold mounted in said holder and conforming to the contour of the repair area of the denture and adapted to be moved into and out of contact with the denture repair area and maintained under pressure thereagainst upon appropriate manipulation of said screw, and a heating means mounted in said tubular screw for applying heat through said screw, said holder and said mold, to the repair area of the denture while the mold is held thereagainst under pressure.

2. In a denture repairing device, a base for supporting a denture to be repaired, a member adjustable to different positions over said base, a matrix holder for supporting a mold so that it is applicable to the area of the denture to be repaired, means associated with said member and said matrix holder for moving the latter towards the repair area of the denture and for holding said mold under pressure against said area, including a nut pivoted on said member, a screw adjustable in said nut and engaged with said holder, said screw having a bore therein extending to a point near the holder, and a heater insertable into said bore to apply heat through said holder and the mold to said repair area.

3. In a denture repairing device, a base for supporting a denture to be repaired, a member adjustable to different positions over said base, a matrix holder for supporting a mold so that it is applicable to the area of the denture to be repaired, means associated with said member and said matrix holder for moving the latter towards the repair area of the denture and for holding said mold under pressure against said area, including a nut pivoted on said member, a screw adjustable in said nut and engaged with said holder, and means for holding said holder against turning when said screw is adjusted, said screw having a bore therein extending to a point near the holder for reception of a heater to apply heat through said holder and the mold to said repair area.

4. In a denture repairing device, a base adapted to support a denture to be repaired, a member hinged to said base and adapted to be swung into different positions overlying said base, a nut pivoted on said member, a screw adjustable in said nut toward and away from said base, a matrix holder adapted to contain a mold so that the mold may be applied to the repair area of the denture, said holder having a socket therein in which said screw is rotatably engaged, and means for holding the holder against turning relative to the screw, said screw having a bore extending to a point adjacent the holder for reception of a heater.

5. In a denture repairing device, a base adapted to support a denture to be repaired, a member hinged to said base and adapted to be swung into different positions overlying said base, a nut pivoted on said member, a screw adjustable in said nut toward said base, a matrix holder adapted to contain a mold so that the mold may be applied to the repair area of the denture, said holder having a socket therein in which said screw is rotatably engaged, means for holding the holder against turning relative to the screw, said screw having a bore extending to a point adjacent the holder for reception of a heater, and a socketed heater holder mounted on said hinged member.

6. In a denture repairing device, a base adapted to support a denture to be repaired, a member hinged to said base and adapted to be swung into different positions overlying said base, a nut pivoted on said member, a screw adjustable in said nut toward said base, a matrix holder adapted to contain a mold so that the mold may be applied to the repair area of the denture, said holder having a socket therein in which said screw is rotatably engaged, means for holding the holder against turning relative to the screw, said screw having a bore extending to a point adjacent the holder for reception of a heater, and means for holding said hinged member against movement on its hinge when said screw is operated to press the mold against the repair area of the denture.

7. In a denture repair device, a supporting member adapted to be extended over a denture to be repaired, means supporting said member, means for holding a denture in a predetermined position relative to said member with its repair area exposed, a matrix holder for a mold which is applicable to said repair area, means associated with said member and said holder for manipulating the holder to present the mold under pressure against the repair area of the denture, including a nut pivoted in said supporting member, a tubular screw adjustable in said nut and seated against said holder, and a heating means in the bore of said screw.

8. In a denture repair device, a supporting member adapted to be extended over a denture to be repaired, means supporting said member, means for holding a denture in a predetermined position relative to said member with its repair area exposed, a matrix holder for a mold which is applicable to said repair area, means associated with said member and said holder for manipulating the holder to present the mold under pressure against the repair area of the denture, including a nut pivoted on said member, a tubular screw adjustable in said nut and seated against said holder, a heating means in the bore of said screw, a ring on said screw above the nut, and pins on said ring extending through the nut and engaging and holding said holder against turning relative to said screw.

9. In a denture repairing device, a base adapted to support a denture to be repaired, a member hinged to said base and adapted to be swung into different positions overlying said base, a nut pivoted on said member, a screw adjustable in said nut toward and away from said base, a matrix holder adapted to contain a mold so that the mold may be applied to the repair area of the denture, said holder having a socket therein in which said screw is rotatably engaged, means for preventing the holder from turning relative to the screw.

10. In a denture repairing device, a base adapted to support a denture to be repaired, a member hinged to said base and adapted to be swung into different positions overlying said base, a nut pivoted on said member, a screw adjustable in said nut toward and away from said base, a matrix holder adapted to contain a mold so that the mold may be applied to the repair area of the denture, said holder having a socket therein in which said screw is rotatably engaged, means for preventing the holder from turning relative to the screw, and a socketed heater holder mounted on said hinged member.

11. In a denture repairing device, a base adapted to support a denture to be repaired, a member hinged to said base and adapted to be swung into different positions overlying said base, a nut pivoted on said member, a screw adjustable in said nut toward and away from said base, a matrix holder adapted to contain a mold so that the mold may be applied to the repair area of the denture, said holder having a socket therein in which said screw is rotatably engaged, means for preventing the holder from turning relative to the screw, and means for holding said hinged member against movement on its hinge when said screw is operated to press the mold against the repair area of the denture.

ALLEN BERNARD CLINE.